May 3, 1932. M. E. ZELLER 1,856,899
LIQUID LEVEL GAUGE
Filed Oct. 19, 1929
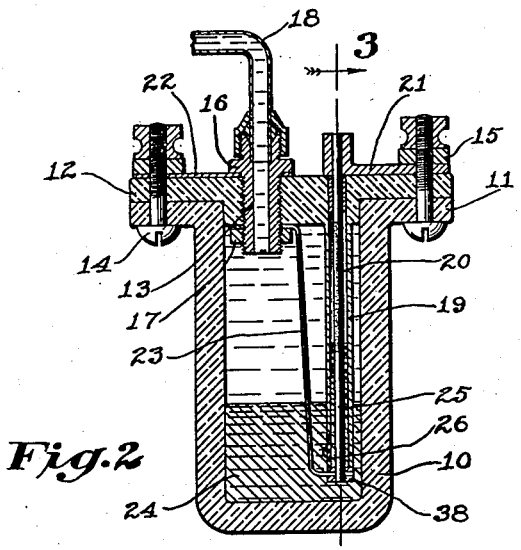
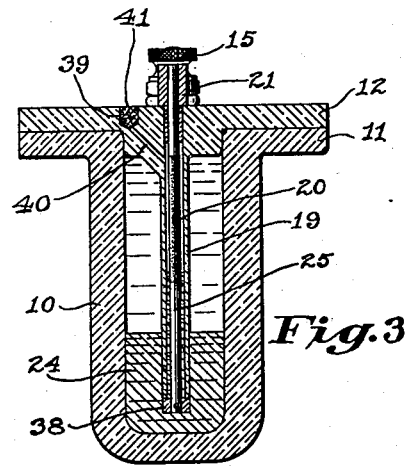
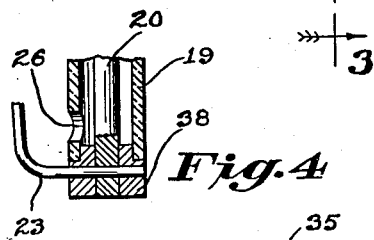
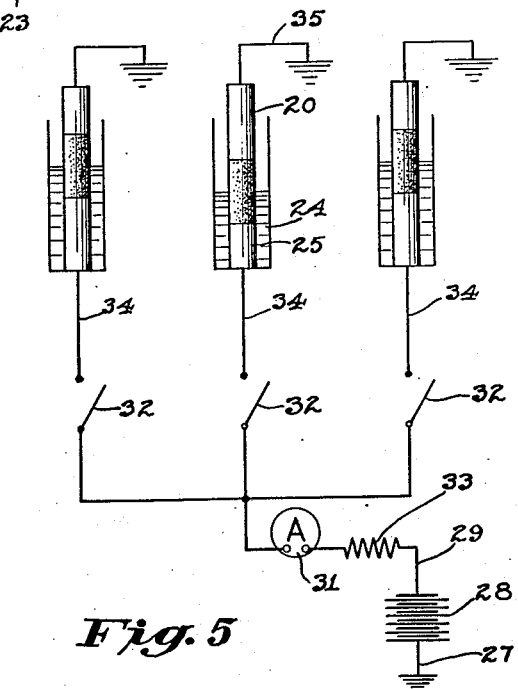
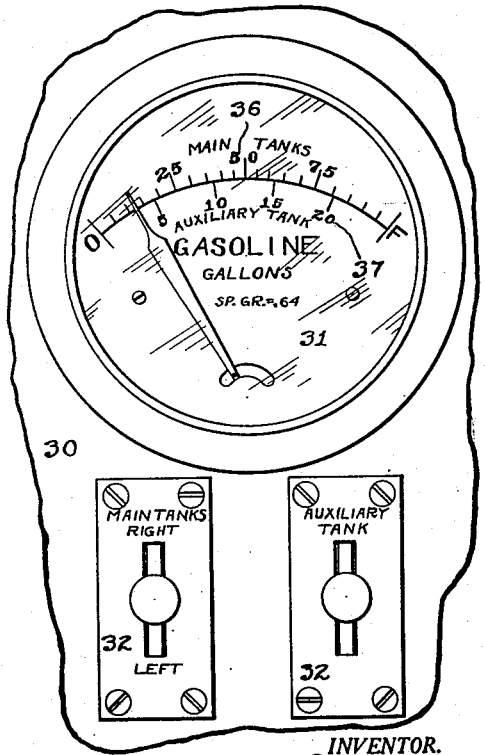

Patented May 3, 1932

1,856,899

UNITED STATES PATENT OFFICE

MYRON E. ZELLER, OF DEARBORN, MICHIGAN

LIQUID LEVEL GAUGE

Application filed October 19, 1929. Serial No. 400,775.

The object of my invention is to provide a liquid level gauge of simple, durable, and inexpensive construction.

A further object of my invention is to provide a liquid level gauge especially adapted for use with a gasoline fuel tank. There are no mechanical moving parts in this device which might be liable to get out of order so that its use is recommended where reliability is essential.

Still a further object of my invention is to provide a liquid level gauge which is secured adjacent to the bottom of a fuel tank and which is provided with an insulated wire extending to a gauge mounted on an instrument board. The gauge can therefore be disposed a considerable distance away from the tank.

Still a further object of my invention is to provide a liquid level gauge which is especially adapted for use with airplanes to indicate the exact amount of fuel in the various fuel tanks therein. Airplanes are usually provided with one or more main fuel tanks together with an auxiliary tank. In the larger planes it has been found desirable to place the tanks in the wings. The tanks are therefore a considerable distance away from the instrument board in the pilot's compartment so that the ordinary mechanically operated gauge is not suitable.

Still a further object of my invention is to provide a liquid level gauge which has an electrical resistance element therein, the effective length of this element being controlled by the pressure of the fuel due to its height in the tank. Many types of electrical gauges have been produced for use in fuel tanks. The gauges of this type with which the applicant is familiar are provided with a rheostat which is operated by a float disposed in the fuel tank. The danger from explosion when using any type of rheostat either in the tank or in direct contact with the fuel is obvious. Further, the float used in such tanks rises and falls with the surging of the level in the tank so that under some conditions it is hard to obtain accurate readings.

The resistance used with my improved liquid level gauge does not at any time come in direct contact with the fuel so that the danger from sparks is entirely eliminated. Further, no float mechanism is required with this device. The reading obtained on the gauge always represents the mean fuel level in the tank regardless of the surging of the surface of the liquid.

With these and other objects in view, my invention consists in the arrangement, construction, and combination of the various parts of my improved device, as described in my specification, claimed in my claims, and illustrated in the accompanying drawings, in which:

Figure 1 shows an instrument board having my fuel gauge mounted thereon.

Figure 2 shows a vertical central sectional view taken through the current regulator used with the gauge, shown in Figure 1.

Figure 3 shows a sectional view taken on the line 3—3 of Figure 2.

Figure 4 shows an enlarged view of the means for connecting the resistance element, and Figure 5 shows the electrical hook-up employed where the level of the fuel in two main fuel tanks and an auxiliary fuel tank can be selectively read from one instrument gauge.

Referring to the accompanying drawings, I have used the reference numeral 10 to indicate generally a cup shaped reservoir having a flanged upper edge 11. A cover 12 having a pilot 13 extending a short distance into the reservoir is secured to the flange 11 by means of screws 14 and nuts 15. The members 10 and 12 are preferably made from suitable insulating material.

A fitting 16 is secured in the center part of the cover 12 by means of a nut 17 and a tube 18 extends from this fitting to the fuel tank. It is desirable to place the reservoir near the fuel tank so that only a short tube will be required.

A tubular shaft 19 formed integral with the cover member 12 extends downwardly adjacent to the bottom of the reservoir 10. Loosely fitting within the shaft 19 a resistance bar 20 is provided which extends the full length of the shaft. The upper end of the bar 20 is secured to a terminal 21 which is held in place by one of the nuts 15. The resistance bar 20 may be of any suitable resistance material, and I have found that a mixture of graphite and a phenol-condensate molded to shape provides a suitable resistance for this bar. When such a resistance bar is used I have found that copper plating the end portion of the bar, as at 25, helps in making an electrical contact therewith.

A conductor strip 22 is clamped beneath the other nut 15 and the fitting 16. This fitting is provided with a lead wire 23 which is clamped beneath the nut 17 inside of the cover 12 and extends downwardly in the reservoir 10 where it connects with the lower end of the resistance bar 20. Referring to Figure 4, a metal sleeve 38 is secured to the lower end of the bar 20 and is piloted in the lower end of the tubular shaft 19. The wire 23 extends transversely through this sleeve and bar so that a connection is made with the strip 22.

A quantity of mercury 24 is placed in the reservoir 10 to a point slightly below the copper plating on the lower end of the resistor bar 20 and an opening 26 provided in the lower end of the shaft 19 allows the mercury to enter the space between the bar and shaft thereby contacting with the plating on the resistance bar 20.

A pocket 39 is formed in the cover 12. A diagonal opening 40 extends from the bottom of the pocket to the bore in the shaft 19 near its upper end. The pocket 39 is filled with steel wool 41 so that air may filter therethrough into the space above the mercury. If the device should be inverted the mercury is prevented from escaping by the steel wool.

The tube 18 which runs to the bottom of the fuel tank conducts the fuel into the reservoir 10 above the mercury. As the level of the fuel in this tank is raised, the fuel pressure on the surface of the mercury in the reservoir 10 increases thereby raising the column of mercury in the tubular shaft 19. As this column of mercury rises above the plating 25 a portion of the resistance bar is short circuited thereby lessening the effective resistance of the bar.

Referring to Figure 5, I have shown the electrical circuit used where the level of the fuel in two main fuel tanks and an auxiliary tank can be selectively read from one instrument gauge. The ordinary lighting battery 28 having one of its terminals grounded at 27 is used to supply the current for the device. The other battery lead 29 is run to an instrument board 30 in the pilot's compartment.

A milliammeter 31 is inserted in the instrument board and several single pole switches 32 are mounted below this meter. One side of each switch is connected to a common lead which is secured to one terminal of the meter. The other terminal of the meter is connected to a fixed resistance unit 33 which is preferably mounted on the rear of the board 30. The lead 29 extends to the unit 33.

An ordinary ammeter may be used in this device with the correct resistance in the unit 33. However, I recommend using a meter drawing at full scale about ten milliamperes of current, and a resistance unit capable of passing this amount of current at the voltage of the battery 28 so that when one of the switches is grounded the meter will show a full scale reading.

Each of the fuel tanks is provided with a current regulator, consisting of the reservoir 10, cover 12, resistance bar 20, and associated parts, previously described. Wires 34 extend from one terminal of each of these regulators to the free terminal of the switches 32, while the other terminals of the regulators are connected to the ground by wires 35. When any one of the switches 32 is closed a circuit is completed which runs from the battery, through the unit 33, milliammeter 31, and the respective current regulator at the fuel tank.

It will be noted that the meter 35 is calibrated with two scales, the upper scale 36 registering gallons in either of the main fuel tanks, while the lower scale 37 registers gallons in the somewhat smaller auxiliary tank.

When the pilot desires to learn the amount of fuel in any of the tanks he operates the respective switch which allows current to flow through the regulator used with that particular tank. The resistance offered by the regulator is varied by the height of the column of mercury in the tubular shaft 19 and this height is controlled by the amount of fuel in the tank. The scale on the milliammeter may therefore be calibrated to register in gallons the amount of fuel in the tank.

If desired three independent meters may be provided, one for each tank, which operate from three switches or from a single switch, as the ignition switch. In order to conserve the space on the instrument board the applicant prefers the arrangement described herein.

Many advantages arise through the use of my improved device and it may be well to point out that in this device no floats or rheostats in contact with the fuel are required thereby eliminating the fire hazard usually associated with electrical liquid level gauges. Further, the mean fuel level in the tank is recorded so that surging of the liquid therein does not affect the accuracy of the instrument. A further advantage results because any shape of fuel tank may be used and the gauge correctly calibrated for this shape of tank. Further, one gauge may be used for a number of tanks thereby conserving space on the instrument board.

Some changes may be made in the arrangement, construction, and combination of the various parts of my improved device without departing from the spirit of my invention, and it is my intention to cover by my claims such changes as may reasonably be included within the scope therefor.

I claim as my invention:

1. In a device of the character described, a fuel tank, a reservoir containing mercury arranged so that the fuel may flow from said tank into said reservoir, an open ended tube extending from the top of said reservoir into said mercury, a resistance element disposed within said tube so that as the pressure of the fuel upon the mercury in the reservoir increases the mercury within the tube will rise and short-circuit a greater portion of said resistance element, said reservoir having a pocket therein connected by a suitable opening with the upper portion of said tube so that as the mercury rises in said tube the displaced air may be expelled through said opening and pocket, and a quantity of porous fibrous material disposed in said pocket allowing the displaced air to filter therethrough but preventing the passage of the said mercury therethrough in case the reservoir is inverted.

2. In a device of the character described, a fuel tank, a reservoir of insulating material containing mercury arranged so that fuel may flow from said tank into said reservoir, a cap of insulating material disposed over said reservoir having an integral open ended tube extending therefrom into said mercury, a resistance element disposed within said tube so that as the pressure of the fuel upon the mercury in the reservoir increases the mercury within the tube will rise and short-circuit a greater portion of said resistance element, said cap member having a pocket formed therein which is in connection with the upper portion of said tube, thereby allowing the displaced air to filter therethrough, and a quantity of steel wool disposed in said pocket allowing the passage of air but preventing the passage of mercury therethrough.

MYRON E. ZELLER.